(12) United States Patent
Karri et al.

(10) Patent No.: US 12,519,396 B2
(45) Date of Patent: Jan. 6, 2026

(54) IMPLEMENTING ACTIVE CLAMP FLYBACK CONVERTERS WITH IMPROVED EFFICIENCY

(71) Applicant: Cypress Semiconductor Corporation, San Jose, CA (US)

(72) Inventors: Rajesh Karri, Visakhapatnam (IN); Hariom Rai, Bangalore (IN); Pulkit Shah, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 300 days.

(21) Appl. No.: 18/338,206

(22) Filed: Jun. 20, 2023

(65) Prior Publication Data

US 2024/0283365 A1 Aug. 22, 2024

Related U.S. Application Data

(60) Provisional application No. 63/447,008, filed on Feb. 20, 2023.

(51) Int. Cl.
*H02M 3/335* (2006.01)
*H02M 1/00* (2007.01)

(52) U.S. Cl.
CPC ..... *H02M 3/33569* (2013.01); *H02M 1/0058* (2021.05)

(58) Field of Classification Search
CPC .............. H02M 3/33569; H02M 1/0058
See application file for complete search history.

(56) References Cited

U.S. PATENT DOCUMENTS

| | | | | |
|---|---|---|---|---|
| 10,277,130 | B2* | 4/2019 | Quigley | H02M 3/33571 |
| 10,651,754 | B1* | 5/2020 | Murugesan | H02M 3/33523 |
| 10,693,384 | B1* | 6/2020 | Mondal | H02M 3/33592 |
| 10,862,399 | B1* | 12/2020 | Rai | H02M 3/33515 |
| 11,114,945 | B2* | 9/2021 | Ahmed | H02M 3/33592 |
| 2020/0059152 | A1* | 2/2020 | Liu | H02M 3/1588 |
| 2020/0412257 | A1* | 12/2020 | Rai | H02M 3/33538 |
| 2021/0058000 | A1* | 2/2021 | Ahmed | H02J 7/00 |
| 2022/0393597 | A1* | 12/2022 | Shanthosh | H02M 3/33507 |

OTHER PUBLICATIONS

Power Integrations, Inc., InnoSwitch4-CZ Family, Off-Line CV/CC ZVS Flyback Integrated Switcher IC with 750 V PowiGaN, Active Clamp Drive and Synchronous Rectification, InnoSwitch4-CZ, Mar. 2023, 36 pages.

* cited by examiner

*Primary Examiner* — Sisay G Tiku

(57) ABSTRACT

Implementing active clamp flyback (ACF) converters with improved efficiency is described. In one embodiment, an apparatus includes an active clamp flyback (ACF) flyback converter. The ACF flyback converter includes a primary side including a high side (HS) switch, a low side (LS) switch and an ACF driver, and a secondary side including a secondary-side controller configured at least to obtain a set of input parameters, the set of input parameters including a set of subsystem parameters associated with a subsystem and a set of system parameters associated with an initial configuration, determine a set of output parameters based on the set of input parameters, and control operation of the ACF flyback converter based on the set of output parameters.

18 Claims, 6 Drawing Sheets

IMPLEMENTING ACTIVE CLAMP FLYBACK CONVERTERS WITH IMPROVED EFFICIENCY

CROSS-REFERENCE TO RELATED APPLICATION(S)

This application claims the benefit of U.S. Provisional Application No. 63/447,008, filed on Feb. 20, 2023 and entitled "IMPLEMENTING ACTIVE CLAMP FLYBACK CONVERTERS WITH IMPROVED EFFICIENCY", the entire contents of which are incorporated by reference herein.

TECHNICAL FIELD

This disclosure relates to integrated circuits (ICs) that control power delivery to electronic devices.

BACKGROUND

A flyback converter is a system that can generate some direct current (DC) output from a given input provided by a power source. For example, the input can be an alternating current (AC) input provided by an AC source, and the flyback converter can be an AC to DC (AC-DC) flyback converter. As another example, the input can be a DC input provided by a DC source, and the flyback converter can be a DC to DC (DC-DC) flyback converter. Some flyback converters can be used to implement power adapters. For example, a power adapter can be an AC-DC power adapter to convert input AC current or voltage into DC current or voltage usable by an electronic device (i.e., load). As another example, a power adapter can be a DC-DC power adapter to convert input DC current or voltage into DC current or voltage (e.g., to regulate DC current) usable by an electronic device (e.g., by modifying the input DC current or voltage). Power adapters can support power delivery for various types of electronic devices (e.g., such as smartphones, tablets, notebook computers, laptop computers, hubs, chargers, adapters, etc.).

BRIEF DESCRIPTION OF THE DRAWINGS

The disclosure is illustrated by way of example, and not of limitation, in the figures of the accompanying drawings.

DETAILED DESCRIPTION

Figure 1:
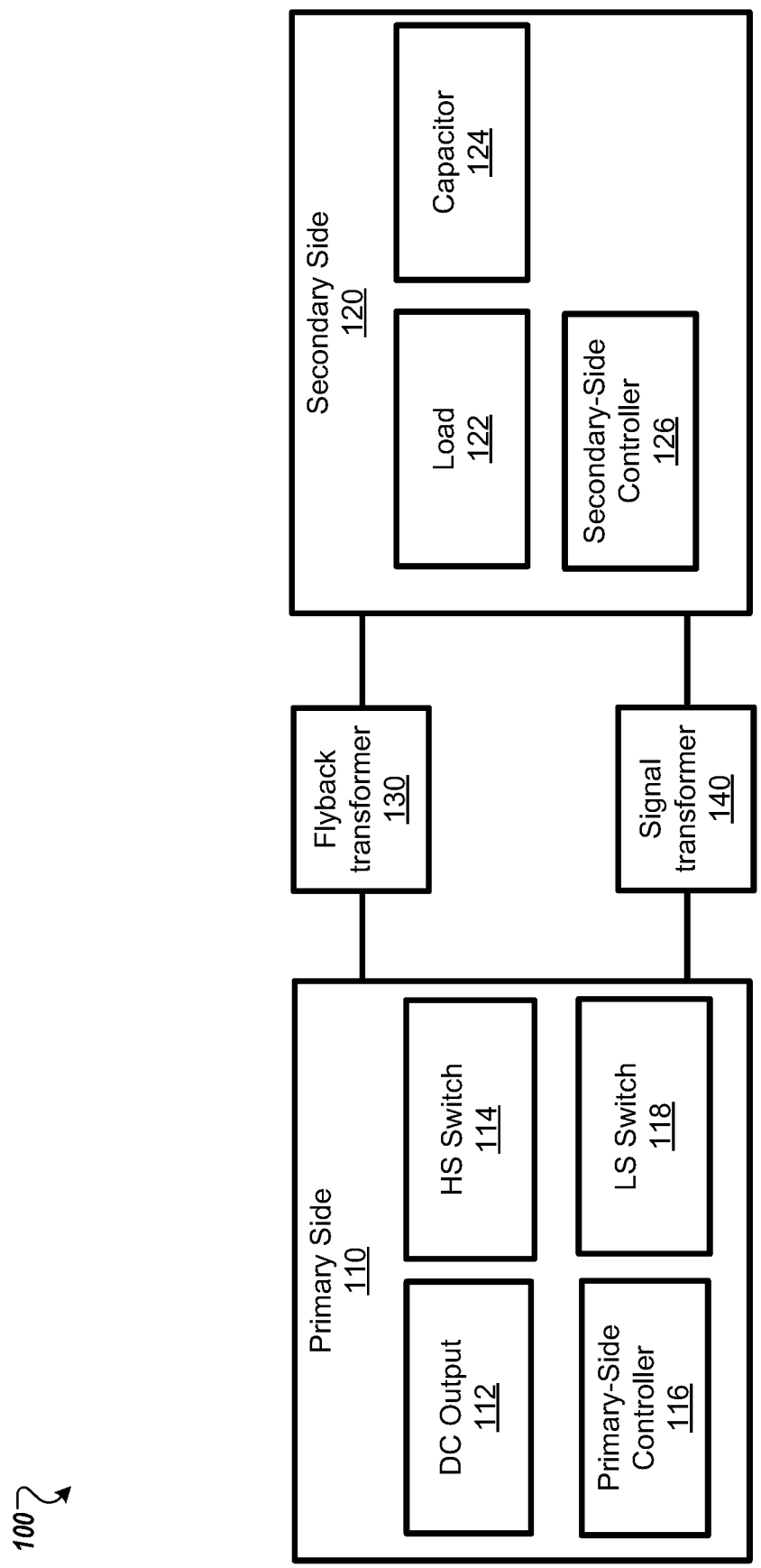
FIG. 1 is a block diagram of a high-level overview of a flyback converter, according to some embodiments.

Described herein are various embodiments of techniques for implementing active clamp flyback (ACF) flyback converters with improved efficiency. A flyback converter can include a primary side having a current input including a power source, at least one primary-side capacitor, a primary-side controller, and at least one primary-side switch. For example, the power source can be an AC power source. The at least one primary-side switch can include a power switch. In some embodiments, the power switch is a field-effect transistor (FET). The flyback converter can further include a secondary side having at least one secondary-side switch and at least one secondary-side capacitor, and can include or be coupled to a load. For example, the at least one secondary side switch can include a diode. A flyback transformer separates the primary side from the secondary side to enable galvanic isolation and prevent direct current flow from the primary side to the secondary side. More specifically, the flyback transformer can include a primary-side winding and a secondary-side winding.

The primary side can further include a primary-side controller coupled to the power switch to control operation of the power switch (e.g., turning the power switch on and off). By controlling operation of the power switch, the state of the flyback converter can be controlled to turn power delivery on and off. More specifically, the flyback converter can cycle between an on-state and an off-state.

For example, when the primary-side controller closes the power switch (e.g., turns the FET on), the flyback converter is placed in the on-state. While the flyback converter is in the on-state, the primary-side winding of the flyback transformer is connected to the power source, and a primary current from the power source flows toward the primary-side winding of the flyback transformer. The primary current charges the primary-side winding of the flyback transformer and increases magnetic flux incident on the secondary-side winding of the flyback transformer, which induces a negative electromotive force (emf) in the secondary-side winding of the flyback transformer in accordance with Faraday's law. The diode of the secondary side blocks current flow from the flyback transformer due to reverse-bias resulting from the negative emf. Instead, the at least one secondary-side capacitor can deliver power to the load. When the primary-side controller opens the power switch (e.g., turns the FET off), the flyback converter is placed in the off-state. While the flyback converter is in the off-state, the primary-side winding of the flyback transformer is disconnected from the power source, and the primary current from the power source stops flowing toward the primary-side winding of the flyback transformer. This decreases the magnetic flux incident on the secondary-side winding, which induces a positive emf in the secondary-side winding of the flyback transformer in accordance with Faraday's law. The diode of the secondary side allows a secondary current to flow from the flyback transformer to due forward-bias resulting from the positive emf. This secondary current is used to charge the at least one secondary-sides capacitor and deliver power to the load.

In some implementations, the secondary side further includes a secondary-side controller. The secondary-side controller can include a signal generator to generate signals. For example, a signal can include a pulse (e.g., a signal with a rapid rise time, followed by a constant voltage period, and followed by a rapid fall time). In some implementations, the secondary-side controller can utilize pulse-width modulation (PWM) to generate a PWM signal. PWM can be used to control (e.g., reduce) the amplitude of the pulse of the control signal.

In some implementations, the secondary-side controller can communicate control signals to the primary-side controller that can be used to control the power switch. More specifically, a signal transformer can be placed between the primary side and the secondary side, and the secondary-side controller can communicate control signals to the primary-side controller via the signal transformer. For example, the signal transformer can be a pulse transformer. Accordingly, the signal transformer can act as a communication link between the primary-side controller and the secondary-side controller.

The secondary-side controller can operate in accordance with a switching frequency, which can be fixed (e.g., static) or variable (e.g., dynamic). A flyback converter can be configured to operate in one or more operating modes based on the amount of time between receiving control signals in accordance with the switching frequency. The flyback converter may need to be designed to support operation in one or more of the operating modes.

One example of an operating mode is continuous conduction mode (CCM). A flyback converter operates in CCM if the primary-side controller causes the power switch to go from open to closed before the primary-side winding has had enough time to discharge completely. In other words, a control signal to close an open power switch is received by the primary-side controller before complete discharge of the primary-side winding of the flyback transformer. Thus, when operating in CCM, the current in the primary-side winding of the flyback transformer is never zero or near-zero.

Another example of an operating mode is discontinuous conduction mode (DCM). A flyback converter operates in DCM if the primary-side controller causes the power switch to go from open to closed after an amount of time sufficient to completely discharge the primary-side conductor. In other words, a control signal to close an open power switch is received by the primary-side controller after complete discharge of the primary-side winding of the flyback transformer. Thus, when operating in DCM, the current in the primary-side winding of the flyback transformer is zero or near-zero for at least some amount of time. DCM can occur if the duty cycle of the control signal is sufficiently short and/or the load is sufficiently small. A duty cycle refers to the amount of activity period during an on-off cycle for a waveform (e.g., signal) or system. Duty cycle can be determined based on a ratio of active time to total period. In some implementations, the duty cycle is expressed as a ratio (e.g., fraction or decimal). In some implementations, the duty cycle is expressed as a percentage. For example, the duty cycle of a waveform can be determined based on a ratio of a pulse width of the waveform to a total period of the signal.

Operation in DCM can be more efficient than, e.g., in CCM due at least in part to the reduced reverse recovery loss with respect to the diode. The improved efficiency can be achieved assuming that the current through the primary-side winding is efficiently delivered. For example, an appropriate duty cycle can be selected during DCM operation to improve power delivery efficiency. Moreover, flyback converters operating in DCM employ zero-current switching (ZCS) and/or zero-voltage switching (ZVS), which can further improve efficiency. However, DCM can result in larger amounts of electromagnetic interference (EMI) and/or noise as compared to CCM, so flyback converters operating in DCM may require additional circuitry to account for the EMI and/or noise.

Yet another example of an operating mode is a critical conduction mode (CrCM). A flyback converter operates in CrCM if the primary-side controller causes current to be delivered to the primary-side winding of the flyback converter upon complete discharge of the primary-side winding of the flyback converter (e.g., once the current in the primary-side winding of the flyback converter is zero). In other words, the power switch is closed (e.g., turned on) approximately immediately after the primary-side winding of the flyback converter is completely discharged. CrCM can occur by employing an appropriately chosen duty cycle for the control signal that can cause current to be delivered to the primary-side winding of the flyback converter at approximately the correct time after the power switch is opened.

The switching frequency can be related to the size of the power supply that can be supported. For example, higher switching frequencies can correspond to smaller power supply sizes. However, one problem that can exist is flyback transformer leakage inductance. At a certain point, the flyback transformer leakage inductance energy can be high enough to damage the flyback converter. Typically, the energy of the flyback transformer leakage inductance can be dissipated in a snubber resistor of a passive clamp of the primary side of the flyback converter.

In some implementations, a flyback converter is an ACF flyback converter including an active clamp. For example, an ACF flyback converter can include a high-side (HS) switch (QHS) and a low-side (LS) switch ($Q_{LS}$). For example, the HS switch and the LS switch can each be a FET. More specifically, the HS switch can be referred to as an ACF switch and can be included in the active clamp, and the LS switch can correspond to the power switch. An ACF driver can be coupled to the HS switch to control operation of the HS switch. For example, the ACF driver can be a gate driver coupled to the gate of the HS switch.

ACF converters can operate in an ACF mode. While operating in the ACF mode, a flyback converter can actively store the energy of the flyback converter leakage inductance in the active clamp. This stored energy can then be provided to the load during the switching cycle, which can improve flyback converter efficiency. Accordingly, ACF flyback converters can reduce or eliminate snubber resistor loss.

The efficiency of a flyback converter can be further improved by achieving ZVS and/or ZCS. More specifically, ZVS and/or ZCS can enable higher switching frequencies and small power supply sizes. Improved efficiency across line and load combinations can be achieved by determining the optimal turn-on time of the HS switch. This can be difficult to determine in the secondary-side controller as the secondary-side controller cannot directly access the primary drain node, and the voltage at the primary drain node can be used to determine the optimal turn-on time of the HS switch. A lower turn-on time may not achieve ZVS and/or ZCS on the primary drain at lower VBUS, higher VIN and can increase noise on the primary drain at higher VBUS. A larger turn-on time can decrease the efficiency at higher VBUS as it can increase transformer losses. Moreover, to achieve optimal efficiency across line-in/VBUS, the turn-on time may need to vary with input line voltage and output VBUS voltage. Use of a fixed value of turn-on time that is optimized for a particular line and load combination can cause efficiency loss on the other voltages. This can be particularly true in the case of applications in which the output VBUS voltage can vary from about 3V to about 30V and the AC input line can vary from about 80V to about 380V. Accordingly, flyback converter efficiency can be improved by optimizing the turn-on time of the HS switch without needing to track the primary drain node voltage.

Described herein are various embodiments of techniques for implementing ACF flyback converters with improved efficiency. Embodiments described herein can enable an adaptive turn-on scheme for the HS switch, which can be used for an ACF flyback converter that can operate in an ACF mode. The secondary-side controller can control the duration of the HS switch based on VBUS and VIN voltages using firmware. The equation for optimized efficiency can be fed into the firmware, which can be used to optimize efficiency across line (VIN) and load (VBUS) conditions.

Embodiments described herein can provide for a secondary-side controller that can implement a firmware-based HS switch pulse width scheme to improve efficiency across input voltages and output voltages. For example, a secondary-side controller can include a flyback controller operatively coupled to a subsystem and firmware. In some embodiments, at least one of the subsystem or the firmware is included in the flyback controller. The subsystem can include a line detecting circuit, a VBUS measurement unit, a load current measurement unit, and a signal transformer driver (e.g., pulse transformer driver). The subsystem can send a set of parameters to the firmware. In some embodiments, the set of parameters includes $V_{IN}$, load current, and $V_{OUT}$. In some embodiments, the set of parameters can be received on-the-fly to support real-time or near real-time processing.

In some embodiments, the secondary-side controller can control a turn-on time of the HS switch. The firmware can be programmed with an equation for the pulse width that is needed to achieve ZVS. For example, $$T_{req\_zvs} \approx \sqrt{L_{pri}C_{pri}}\left(\frac{V_{IN}}{V_{OUT}}N + 1\right) \qquad (1)$$

where $T_{req\_zvs}$ is the pulse width, $L_{pri}$ is the primary inductance with respect to the flyback transformer, $C_{pri}$ is the equivalent capacitance with respect to the primary drain node, N is the turns ratio corresponding to the flyback transformer, $V_{IN}$ is an input voltage value corresponding to the AC voltage input, and $V_{OUT}$ is an output DC voltage value. In some embodiments, $V_{IN}$ is a root mean square (RMS) value derived from AC voltage inputs. In some embodiments, $V_{OUT}$ corresponds to VBUS_IN.

To improve efficiency, the LS switch should be turned on within a specific interval after the HS switch is turned off. Otherwise, the primary drain node can reach a high voltage and a short circuit situation can exist. The duration for which the primary drain stays at 0V, $T_{dur\_zvs}$, can be defined by the following equation:

$$T_{dur\_zvs} \approx \sqrt{L_{pri}C_{pri}}\left(\frac{V_{OUT}}{V_{IN}}N + 1\right) \qquad (2)$$

The secondary-side controller can use equation (2) to determine the dead time of the HS switch, which can be used to control when to close/open the LS switch (i.e., power switch). More specifically, the dead time refers to the amount of time it takes for the HS switch to go from positive (on) voltage to 0 V. For example, the firmware can be programmed with equation (2) to determine $T_{dur\_zvs}$.

Flyback transformer loss ($P_T$) can be a function of the HS switch turn-on time. ACF driver loss ($P_D$) can be fed into the firmware, such that the power loss due to switching ($P_{Loss}$) can be determined as the sum of $P_T$ and $P_D$. Additionally, power gain as a function of line and load components with HS switch turn-on time can be stored as a function in the firmware ($P_{ACF}$). In some embodiments, if the power loss due to switching of HS switch is higher than the power gain at lower loads, the firmware can toggle the HS switch once in multiple cycles to improve efficiency at low loads.

Advantages of implementing ACF flyback converters with improved efficiency, as described herein, include improved efficiency across line ($V_{IN}$) and load (VBUS) conditions, no change in hardware across different customer applications/boards, and the possibility of skipping of HS pulses to improve efficiency for lower loads. Further details regarding implementing ACF flyback converters with improved efficiency will be described below with reference to FIGS. 1-6.

In some embodiments, a flyback converter is implemented within a power adapter. For example, the power adapter can be an AC-DC power adapter. Embodiments described herein can also be implemented in other types of power adapters, power converters, power delivery circuits, or the like. A power adapter described herein can include a power control subsystem having hardware, firmware, or any combination. A power adapter described herein can be coupled to electronic devices (e.g., loads) to enable power delivery. Examples of such electronic devices include, without limitation, personal computers (e.g., laptop computers, notebook computers, etc.), mobile computing devices (e.g., tablets, tablet computers, e-reader devices, etc.), mobile communication devices (e.g., smartphones, cell phones, personal digital assistants, messaging devices, pocket PCs, etc.), connectivity and charging devices (e.g., hubs, docking stations, adapters, chargers, etc.), audio/video/data recording and/or playback devices (e.g., cameras, voice recorders, hand-held scanners, monitors, etc.), and other similar electronic devices that can use connectors (interfaces) for communication, battery charging, and/or power delivery. Embodiments described herein can be used for AC-DC power adapters, GaN-based power adapters operating at or above 600 kHz frequencies, power adapters with primary or secondary-side controllers, power adapters operating in modes of operations, such as DCM, CCM, CrCM, quasi-resonant mode (QR), or the like.

In some embodiments, the power adapter is a Universal Serial Bus (USB) Power Delivery (USB-PD) power adapter configured to operate with a USB-enabled electronic device or system. A USB-enabled electronic device or system may comply with at least one release of a USB specification. Examples of such USB specifications include, without limitation, the USB Specification Revision 2.0, the USB 3.0 Specification, the USB 3.1 Specification, and/or various supplements (e.g., such as On-The-Go, or OTG), versions and errata thereof. The USB specifications generally define the characteristics (e.g., attributes, protocol definition, types of transactions, bus management, programming interfaces, etc.) of a differential serial bus that are required to design and build standard communication systems and peripherals. For example, a USB-enabled peripheral device attaches to a USB-enabled host device through a USB port of the host device to form a USB-enabled system. A USB 2.0 port includes a power voltage line of 5V (denoted VBUS), a differential pair of data lines (denoted D+ or DP, and D− or DN), and a ground line for power return (denoted GND). A USB 3.0 port also provides the VBUS, D+, D−, and GND lines for backward compatibility with USB 2.0. In addition, to support a faster differential bus (the USB SuperSpeed bus), a USB 3.0 port also provides a differential pair of transmitter data lines (denoted SSTX+ and SSTX−), a differential pair of receiver data lines (denoted SSRX+ and SSRX−), a power line for power (denoted DPWR), and a ground line for power return (denoted DGND). A USB 3.1 port provides the same lines as a USB 3.0 port for backward compatibility with USB 2.0 and USB 3.0 communications. Still, it extends the performance of the SuperSpeed bus by a collection of features referred to as Enhanced SuperSpeed.

A more recent technology for USB connectors, called USB Type-C™, is defined in various releases and/or versions of the USB Type-C™ specification (e.g., such as Release 1.0, Release 1.1, etc.). The USB Type-C™ specification defines Type-C™ receptacle, Type-C™ plug, and Type-C™ cables that can support USB communications as well as power delivery over newer USB power delivery protocols defined in various revisions/versions of the USB-PD specification. Examples of USB Type-C™ functions and requirements may include, without limitation, data and other communications according to USB 2.0 and USB 3.0/3.1/3.2, electro-mechanical definitions and performance requirements for Type-C™ cables, electro-mechanical definitions and performance requirements for Type-C™ receptacles, electro-mechanical definitions and performance requirements for Type-C™ plugs, requirements for Type-C™ to legacy cable assemblies and adapters, requirements for Type-C™-based device detection and interface configuration, requirements for optimized power delivery for Type-C™ connectors (also referred to as USB-C connectors), etc. According to the USB Type-C™ specification(s), a Type-C™ port provides VBUS, D+, D−, GND, SSTX+, SSTX−, SSRX+, and SSRX-lines, among others. In addition, a Type-C™ port also provides a Sideband Use (denoted SBU) line for signaling of sideband functionality and a Configuration Channel (denoted CC) line for discovery, configuration, and management of connections across a Type-C™ cable. A Type-C™ port may be associated with a Type-C™ plug and/or a Type-C™ receptacle. The Type-C™ plug and the Type-C™ receptacle are designed as a reversible pair that operates regardless of the plug-to-receptacle orientation for ease of use. Thus, a standard USB Type-C™ connector, disposed as a standard Type-C™ plug or receptacle, provides pins for four VBUS lines, four ground return (GND) lines, two D+ lines (DP1 and DP2), two D-lines (DN1 and DN2), two SSTX+lines (SSTXP1 and SSTXP2), two SSTX- lines (SSTXN1 and SSTXN2), two SSRX+lines (SSRXP1 and SSRXP2), two SSRX-lines (SSRXN1 and SSRXN2), two CC lines (CC1 and CC2), and two SBU lines (SBU1 and SBU2), among others. Embodiments described herein can be used in power-adapter solutions along with Type-C™ $P_D$ capability.

Some USB-enabled electronic devices may be compliant with a specific revision and/or version of the USB-PD specification (e.g., such as Revision 1.0, Revision 2.0, Revision 3.0, etc., or later revisions/versions thereof). The USB-PD specification defines a standard protocol designed to enable the maximum functionality of USB-enabled devices by providing more flexible power delivery along with data communications over a single USB Type-C™ cable through USB Type-C™ ports. The USB-PD specification also describes the architecture, protocols, power supply behavior, parameters, and cabling necessary for managing power delivery over USB Type-C™ cables at up to 100 W of power. According to the USB-PD specification, devices with USB Type-C™ ports (e.g., USB-enabled devices) may negotiate for more current and/or higher or lower voltages over a USB Type-C™ cable than are allowed in older USB specifications (e.g., the USB 2.0 Specification, USB 3.1 Specification, the USB Battery Charging Specification Rev. 1.1/1.2, etc.). For example, the USB-PD specification defines the requirements for a PD contract that can be negotiated between a pair of USB-enabled devices. The PD contract can specify both the power level and the direction of power transfer that both devices can accommodate and can be dynamically re-negotiated (e.g., without device un-plugging) upon request by either device and/or in response to various events and conditions, such as power role swap, data role swap, hard reset, failure of the power source, etc. According to the USB-$P_D$ specification, an electronic device is typically configured to deliver power to another device through a power path configured on a USB VBUS line.

FIG. 1 is a block diagram of flyback converter 100, according to some embodiments. In some embodiments, flyback converter 100 is included within a power adapter. For example, the power adapter can be an AC-DC power adapter. For example, the power adapter can be a USB-PD power adapter. In some embodiments, other converters may be used, e.g., a switching converter, or the like.

Flyback converter 100 can include primary side 110, secondary side 120, flyback transformer 130, and signal transformer 140. In some embodiments, signal transfer 140 is a pulse transformer. As shown, primary side 110 can include DC output component 112, HS switch 114, primary-side controller 116, and LS switch 118. In some embodiments, HS switch 114 and LS switch 118 are FETs. For example, HS switch 114 switch can be an ACF switch and LS switch 118 can be a power switch controllable by primary-side controller 116. HS switch 114 can be included in an active clamp of flyback converter 100. For example, an ACF driver can be coupled to HS switch 114 to control operation of HS switch 114. In some embodiments, HS switch 114 is a FET and the ACF driver is a gate driver, and a gate of HS switch 114 can be coupled to the ACF driver. Secondary side 120 can include (or be coupled to) load 122, capacitor 124 and secondary-side controller 126. In some embodiments, load 122 represents an electronic device connected to flyback converter 100. For example, load 122 can represent an electronic device connected to a power adapter implementing flyback converter 100.

Flyback transformer 130 can have a primary-side winding coupled to primary side 110 and a secondary-side winding coupled to secondary side 120. For example, DC output component 112 can be coupled to a first end of the primary-side winding, and LS switch 118 can be coupled to a second end of the primary-side winding. For example, if LS switch 118 is a FET, then the second end of the primary winding of flyback transformer 130 can be coupled to a source/drain of LS switch 118. Signal transformer 140 can have a primary-side winding coupled to primary side 110 and a secondary-side winding coupled to secondary side 120.

An example operation of flyback converter 100 will now be described. DC output component 112 can receive an AC input from an AC input source and convert the AC input into a corresponding DC output. For example, DC output component 112 can include a rectifier to generate the DC output. In some embodiments, the rectifier is a bridge rectifier including a set of diodes. In some embodiments, DC output component 112 includes an electromagnetic interference (EMI) filter. Further details regarding DC output component 112 are described below with reference to FIG. 2.

Primary-side controller 116 can control operation of LS switch 118 to control a state of flyback converter 100. For example, when primary-side controller 116 closes LS switch 118 (e.g., turns the FET on), flyback converter 100 is placed in the on-state. While flyback converter 100 is in the on-state, the DC output generated by DC output component 112 flows toward the primary-side winding of flyback transformer 130. The DC output generated by DC output component 112 charges the primary-side winding of flyback transformer 130 and increases magnetic flux incident on the secondary-side winding of flyback transformer 130, which induces a negative emf in the secondary-side winding of flyback transformer 130 in accordance with Faraday's law. A diode blocks current flow from flyback transformer 130 due to reverse-bias resulting from the negative emf. Instead, capacitor 124 can deliver power to load 122. When primary-side controller 116 opens LS switch 118 (e.g., turns the FET off), flyback converter 100 is placed in the off-state. While flyback converter 100 is in the off-state, the primary-side winding of flyback transformer 130, the DC output generated by DC output component 112 stops flowing toward the primary-side winding of flyback transformer 130. This decreases the magnetic flux incident on the secondary-side winding of flyback transformer 130, which induces a positive emf in the secondary-side winding of flyback transformer 130 in accordance with Faraday's law. A diode allows current to flow from flyback transformer 130 to due forward-bias resulting from the positive emf. This secondary current is used to charge capacitor 124 and deliver power to load 122.

Secondary-side controller 126 can include a signal generator to generate signals. For example, a signal can include a pulse. A pulse can have a fixed width or a variable width. In some embodiments, secondary-side controller 126 utilizes PWM to generate a PWM signal. In some embodiments, secondary-side controller 126 can communicate control signals to primary-side controller 116 that can be used to control LS switch 118. More specifically, secondary-side controller 126 can communicate control signals to the primary-side controller via signal transformer 140.

Control signals generated by secondary-side controller 126 can, upon receipt by primary-side controller 116, cause primary-side controller 116 to control operation of LS switch 118. For example, in response to receiving a turn-on control signal, primary-side controller 116 can cause LS switch 118 to close (e.g., turn on the FET). In response to receiving a turn-off control signal, primary-side-controller 116 can cause LS switch 118 to open (e.g., turn off the FET). For example, if LS switch 118 is a FET, then primary-side controller 116 can apply a turn-on voltage (e.g., pulse) to the gate of LS switch 118 to turn on LS switch 118 (e.g., cause the source/drain of LS switch 118 to go low). In some embodiments, the turn-on voltage is about 12V. Primary-side controller 116 can apply a turn-off voltage (e.g., pulse) to the gate of LS switch 118 to turn off LS switch 118 (e.g., cause the source/drain of LS switch 118 to go high).

In some embodiments, primary-side controller 116 includes a comparator or differential amplifier having a pair of input terminals connected to signal transformer 140, and an output terminal connected to LS switch 118. The comparator can generate an output signal based on a pair of input signals received from signal transformer 140, which can be used to control LS switch 118.

Secondary-side controller 126 can send any combination of pulses indicating a specific bit pattern to primary-side controller 116, without requiring clock synchronization. In one embodiment, secondary-side controller 126 includes a state machine to synchronize each function of primary-side controller 116 to be programmed (e.g., calibrated, trimmed, or the like). Secondary-side controller 126 can store other information, such as user-defined settings. For example, the user-defined settings pertaining to the primary-side functionality, such as over-voltage (OV), under-voltage (UV), over-current (OC), short-circuit detection, over-temperature (OT), line voltage, peak current limits, or the like, can be stored in the non-volatile memory of secondary-side controller 126. Firmware of secondary-side controller 126 can transfer this information to primary-side controller 116 in a similar manner at appropriate times, such as at boot-up or later during the operation of the converter at a specific time. During a no-load case, information regarding the turning on of LS switch 118 is not required to be sent.

Secondary-side controller 126 can generate control signals in accordance with a switching frequency, which can be fixed (e.g., static) or variable (e.g., dynamic). Flyback converter 100 can be configured to operate in one or more operating modes based on the amount of time between receiving control signals in accordance with the switching frequency. In some embodiments, control signals generated by secondary-side controller 126 are signal are sent to primary-side controller 116 via signal transformer 140 to control HS switch 114 and/or LS switch 118 (e.g., closed or open). For example, primary-side controller 116 can include a comparator connected to both ends of the primary-side winding of signal transformer 140, and the output of the comparator of primary-side controller 116 can control HS switch 114 and/or LS switch 118.

In some embodiments, secondary-side controller 126 implements a firmware-based pulse width scheme with respect to HS switch 114 to improve the efficiency across input voltages (e.g., $V_{IN}$) and output voltages (e.g., $V_{OUT}$). For example, as will be described in further detail below with reference to FIG. 2, secondary-side controller 126 can include a flyback controller operatively coupled to a subsystem and firmware. In some embodiments, at least one the subsystem or the firmware is included in the flyback controller. The subsystem can include a line detecting circuit, a VBUS measurement unit, a load current measurement unit, and a signal transformer driver (e.g., pulse transformer driver). The subsystem can send a set of parameters to the firmware. In some embodiments, the set of parameters includes $V_{IN}$, load current, and $V_{OUT}$. In some embodiments, the set of parameters can be received on-the-fly to support real-time or near real-time processing.

In some embodiments, secondary-side controller 126 can control a turn-on time of HS switch 114. The firmware can be programmed with an equation for the pulse width that is needed to achieve ZVS. For example the pulse width can be determined using equation (1).

To improve efficiency, LS switch 118 should be turned on within a specific interval after HS switch 114 is turned off. Otherwise, the primary drain node can reach a high voltage. For example, the duration for which the primary drain stays at 0V, $T_{dur\_zvs}$, can be determined using equation (2). Secondary-side controller 126 can use $T_{dur\_zvs}$ to determine the dead time for HS switch 114, which can be used for controlling when to close/open LS switch 118. For example, the firmware can be programmed with equation (2) to determine $T_{dur\_zvs}$.

Flyback transformer loss ($P_T$) can be a function of the turn-on time of HS switch 114. ACF driver loss ($P_D$) can be fed into the firmware, such that the power loss due to switching ($P_{Loss}$) can be determined as the sum of $P_T$ and $P_D$. Additionally, power gain as a function of line and load components with the turn-on time of HS switch 114 can be stored as a function in the firmware ($P_{ACF}$). In some embodiments, if the power loss due to switching of HS switch 114 is higher than the power gain at lower loads, the firmware can toggle HS switch 114 once in multiple cycles to improve efficiency at low loads. Further details regarding implementing active clamp flyback converters with improved efficiency will now be described below with reference to FIG. 2.

Figure 2:
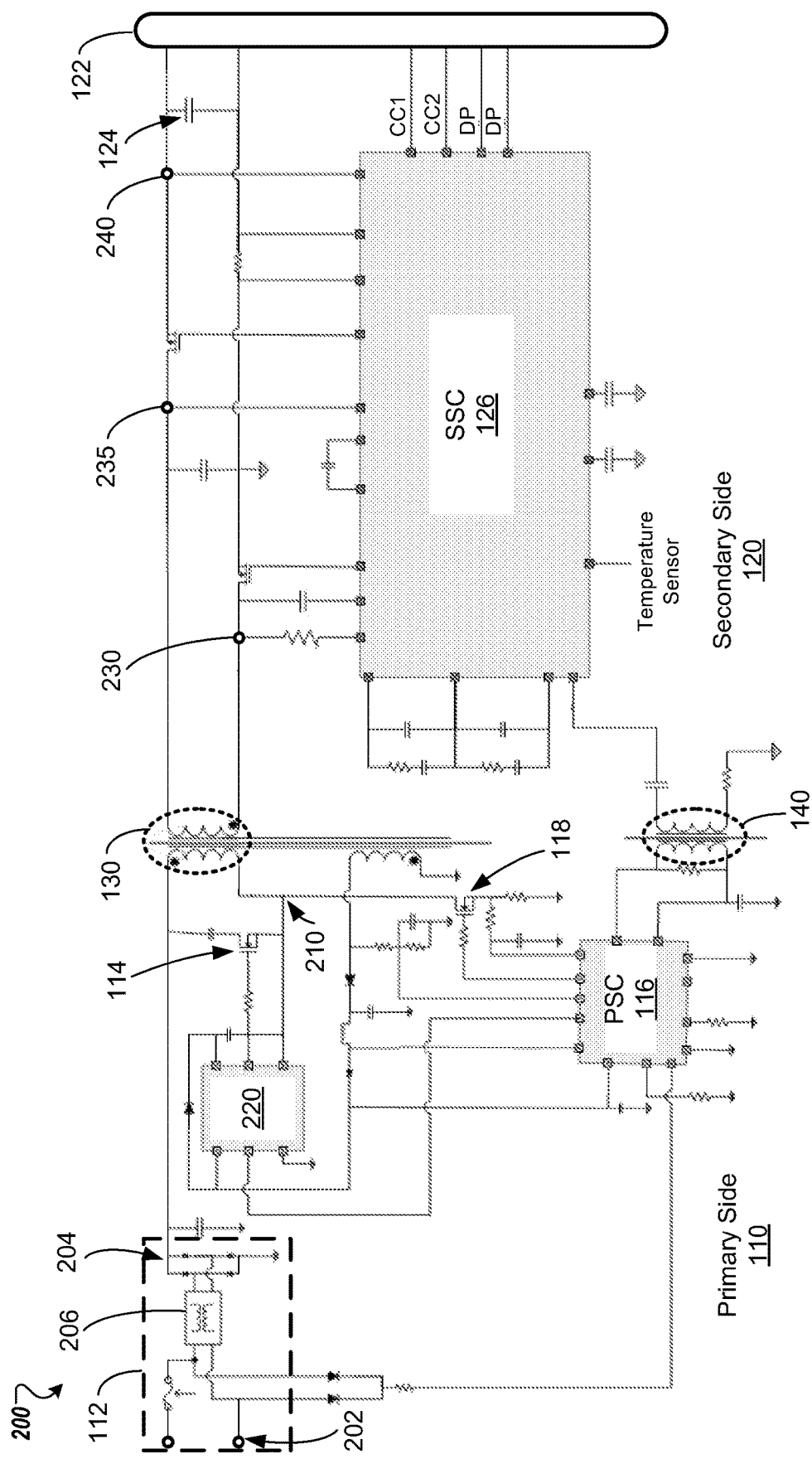
FIG. 2 is a block diagram of a system implementing a flyback converter, according to some embodiments.

FIG. 2 is a block diagram of system 200, according to some embodiments. In some embodiments, system 200 includes a power adapter. For example, system 200 can include a USB-$P_D$ power adapter. System 200 includes a flyback converter, such as flyback converter 100. In some embodiments, flyback converter 100 is an ACF flyback converter including an ACF to operate in an ACF mode.

For example, system 200 can include primary side 110 having DC output component 112, HS switch (e.g., QHS) 114, primary-side controller 116, LS switch (e.g., $Q_{LS}$) 118, and primary drain node (PDN) 210. In some embodiments, and as shown in FIG. 2. HS switch 114 and LS switch 118 are FETs. ACF driver 220 can be coupled to HS switch 114 to form at least a portion of an active clamp of the flyback converter. In some embodiments, ACF driver 220 can be a gate driver coupled to a gate of HS switch 114 (e.g., if HS switch 114 is a FET). System 200 can further include secondary side 120, which can include or be coupled to load 122, capacitor 124, and secondary-side controller 126. Secondary side 120 can further include sense node (SR_NODE) 230 and VBUS node 240. In some embodiments, sense node 230 is a drain node (SR_DRAIN). In this illustrative example, load 122 is a USB connector (e.g., USB Type-C™ connector).

In some embodiments, DC output component 112 can be coupled to AC source 202 providing an AC input. For example, DC output component 112 can include rectifier 204, coupled to AC source 202, to generate a DC output from the AC input received from AC source 202. In some embodiments, rectifier 204 is a bridge rectifier, including a set of diodes. In the illustrative example shown in FIG. 2, rectifier 204 is a bridge rectifier, including four diodes. However, such an example should not be considered limiting. In some embodiments, and as shown in FIG. 2, DC output component 112 can further include EMI filter 206.

System 200 can further include flyback transformer 130 and signal (e.g., pulse) transformer 140. Flyback transformer 130 can have any suitable polarity between its primary-side winding and its secondary-side winding. The polarity of a transformer can correspond to a phase-shift implemented by the transformer between its primary-side winding and its secondary-side winding. In some embodiments, and as indicated by the dot orientation, flyback transformer 130 implements 180° phase-shift between the primary-side winding and the secondary-side winding (i.e., current/voltage for both windings rise and fall together).

Signal transformer 140 can have any suitable polarity between its primary-side winding and its secondary-side winding. In some embodiments, and as indicated by the dot orientation, signal transformer 140 implements 0° phase-shift between the primary-side winding and the secondary-side winding (i.e., current/voltage for one winding rises while current/voltage for the other winding falls). Accordingly, in some embodiments, system 200 includes an AC-DC power adapter implementing an AC-DC flyback converter.

In some embodiments, secondary-side controller 126 implements a firmware-based pulse width scheme with respect to HS switch 114 to improve the efficiency across input voltages (e.g., $V_{IN}$) and output voltages (e.g., $V_{OUT}$). $V_{IN}$ is an input voltage value corresponding AC source 202, and $V_{OUT}$ is an output voltage value. In some embodiments, $V_{IN}$ is an RMS value derived from AC voltage inputs. In some embodiments, $V_{OUT}$ corresponds to VBUS_IN node 235.

More specifically, the firmware-based pulse width scheme can be implemented based on information derived from sense node 230 and VBUS node 240. For example, and as will now be described in further detail below with reference to FIG. 3, secondary-side controller 126 can include a flyback controller operatively coupled to a subsystem that can obtain a set of subsystem parameters including information derived from sense node 230 and VBUS node 240, and firmware that can maintain a set of functions for determining a set of output parameters based at least in part on the set of subsystem parameters.

Figure 3:
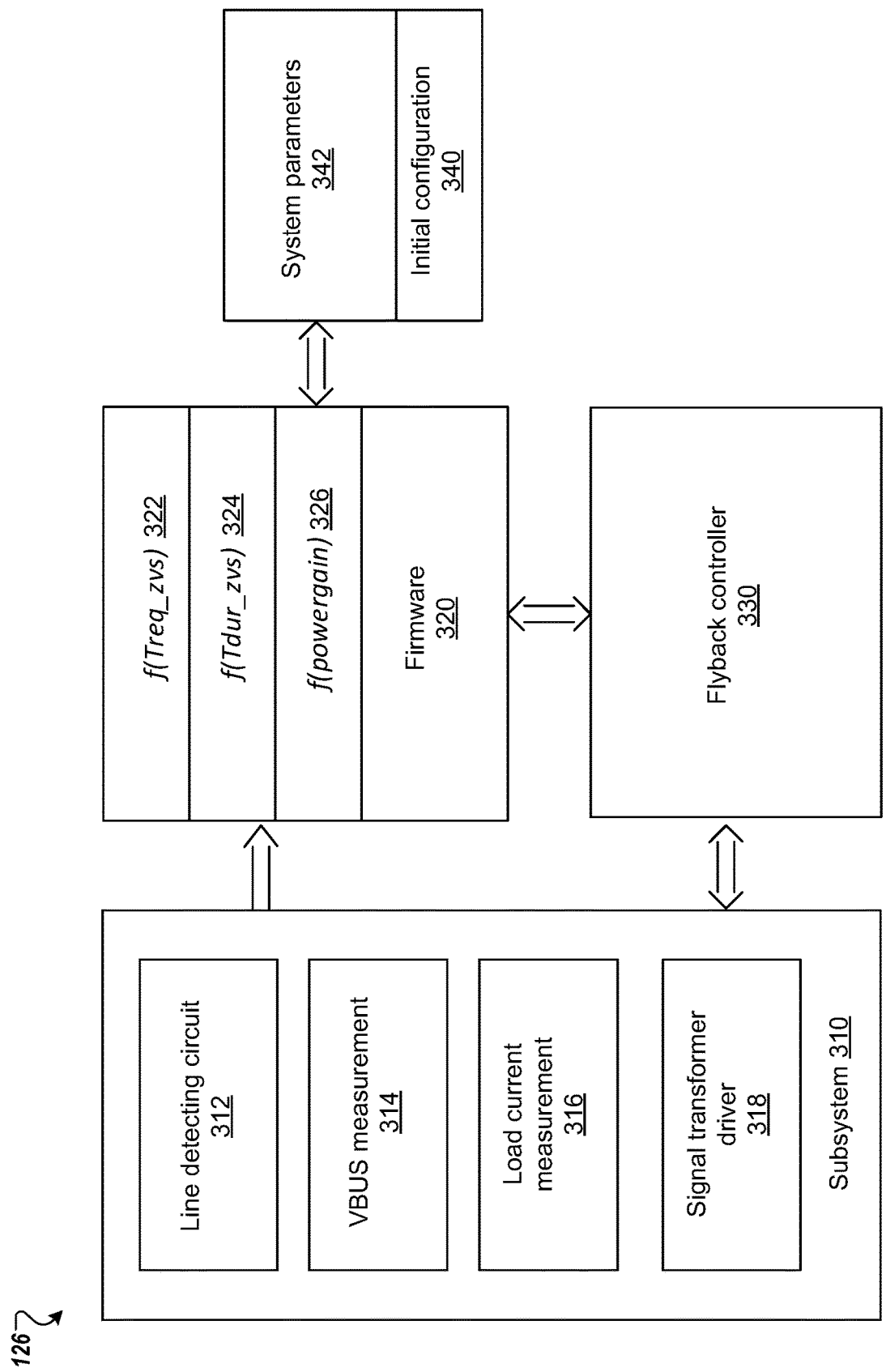
FIG. 3 is a diagram illustrating a system level figure for generating a signal for a switch of a flyback converter, according to some embodiments.

FIG. 3 is a block diagram of an example portion of secondary-side controller 126 illustrating a system level figure for generating a signal for a switch, according to some embodiments. For example, the signal can be an ACF signal for an ACF FET. As shown, secondary-side controller 126 can include subsystem 310, firmware 320, and flyback controller 330. In some embodiments, at least one of subsystem 310 or firmware 320 is included in flyback controller 330.

Subsystem 310 can include various components. For example, subsystem 310 can include line detecting circuit 312, VBUS measurement component 314, load current measurement component 316, and signal (e.g., pulse) transformer driver 318. Subsystem 310 can send a set of subsystem parameters to firmware 320. In some embodiments, the set of subsystem parameters includes $V_{IN}$, load current, and $V_{OUT}$. In some embodiments, the set of subsystem parameters can be received on-the-fly to support real-time or near real-time processing.

Firmware 320 can further receive initial configuration 340, which can include set of system parameters 342. In some embodiments, set of system parameters 342 includes $L_{pri}$, $C_{pri}$ and N. $L_{pri}$ is the primary inductance with respect to the flyback transformer (e.g., flyback transformer 130). $C_{pri}$ is the equivalent capacitance with respect to the primary drain node (e.g., PDN 210), and N is the turns ratio corresponding to the flyback transformer (e.g., flyback transformer 130). Accordingly, the set of subsystem parameters and set of system parameters 342 can collectively form a set of input parameters.

In some embodiments, secondary-side controller 126 can control a turn-on time of an HS switch of the flyback converter (e.g., HS switch 114 of FIGS. 1-2). Firmware 320 can be programmed with a function for determining $T_{req\_zvs}$ that is needed to achieve ZVS, represented by f ($T_{req\_zvs}$). For example, the firmware can be programmed with equation (1) to determine $T_{req\_zvs}$.

To improve efficiency, an LS switch of the flyback converter (e.g., LS switch 118 of FIGS. 1-2) should be turned on within a specific interval after the HS switch is turned off. Otherwise, a primary drain node (e.g., PDN 210) can reach a high voltage. Firmware 320 can be programmed with a function for determining $T_{dur\_zvs}$, represented by f ($T_{dur\_zvs}$). For example, firmware 320 can be programmed with equation (2) to determine $T_{dur\_zvs}$. $T_{dur\_zus}$ can be used to determine the dead time of the HS switch, which can be used by the flyback controller to control the operation of the LS switch.

Flyback transformer loss ($P_T$) can be a function of the turn-on time of the HS switch. ACF driver loss ($P_D$) can be fed into firmware 320, such that the power loss due to switching ($P_{Loss}$) can be determined as the sum of $P_T$ and $P_D$. Additionally, power gain as a function of line and loan components with the turn-on time of the HS switch can be stored as a function in firmware 320, represented by f (powergain). In some embodiments, if the power loss due to switching of HS switch 114 is higher than the power gain at lower loads, then firmware 320 can toggle the HS switch once in multiple cycles to improve efficiency at low loads.

Figure 4:
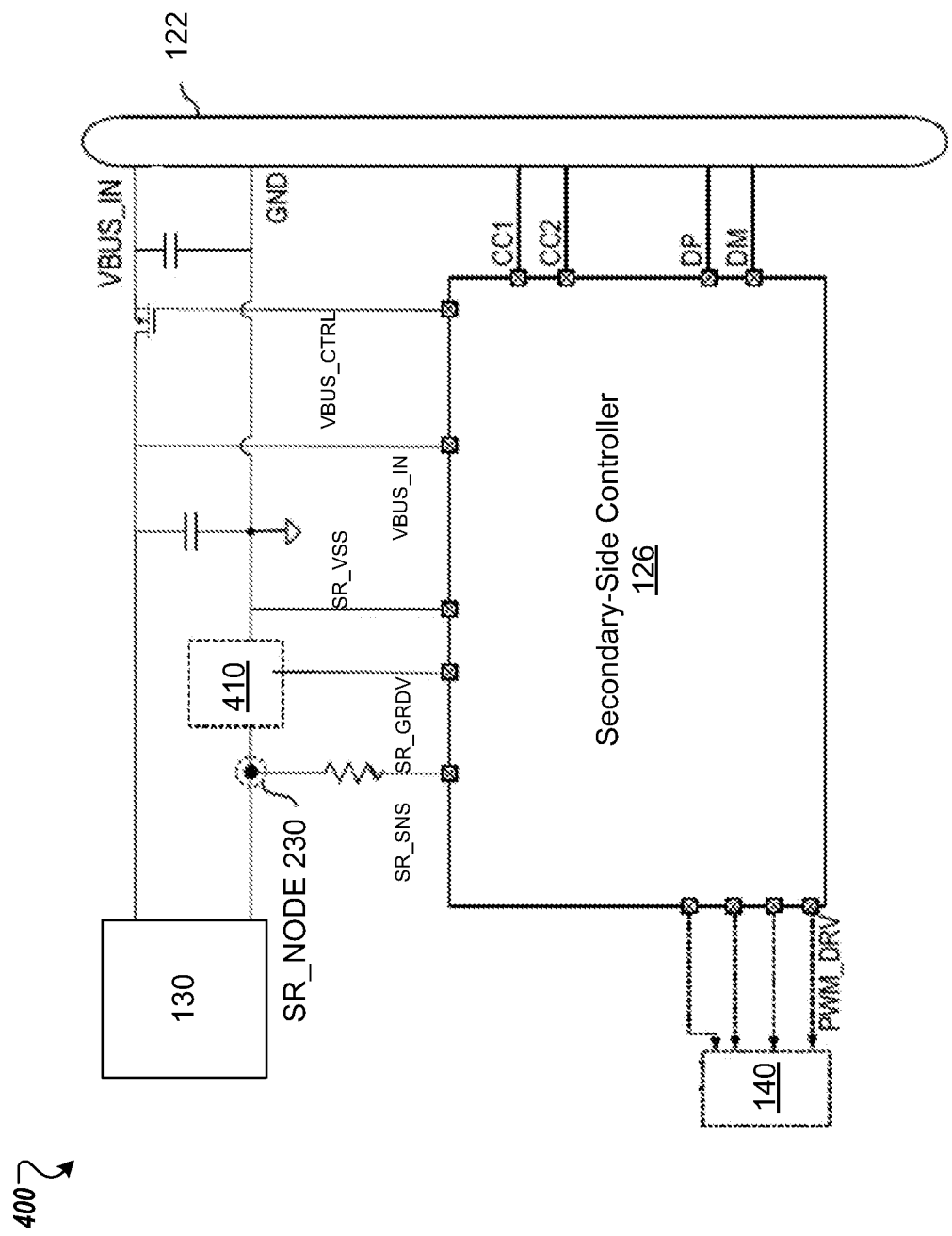
FIG. 4 is a schematic diagram of an example secondary side circuitry of a power adapter, according to some embodiments.

FIG. 4 is a schematic diagram of an example portion of a system 400 implementing a flyback converter, according to some embodiments. More specifically, the portion of the system includes a secondary side of the flyback converter. In some embodiments, system 400 includes a power adapter. For example, system 400 can include a USB-PD power adapter. As shown, system 400 can include secondary-side controller 126, flyback transformer 130, and signal transformer 140, SR NODE 230 and load (e.g., USB connector) 122 as described above with reference to FIGS. 1-2. Moreover, system 400 can further include switch component 410. In some embodiments, switch component 410 includes a diode. Additionally, switch component 410 can include a transistor (e.g., FET).

Secondary-side controller 126 may be disposed as an integrated circuit (IC) chip that includes a subsystem configured in accordance with the techniques for ACF control described herein. Secondary-side controller 126 can negotiate a PD contract with a consumer electronic device ("consumer device") (not shown) attached to load 122 and control, through an output pin ("PWM_DRV"), the required VBUS voltage that is output from flyback transformer 130. Load 122 is typically associated with a plug (e.g., USB Type-C™ plug), but it should be understood that, in various embodiments, load 122 may be associated with a receptacle instead (e.g., USB Type-C™ receptacle).

Secondary-side controller 126 can be coupled to a VBUS_IN line and is configured to control the operation and state of power switches when fault conditions are detected by providing control signals to the gate of the switches. VBUS_IN line can include a provider switch configured as an on/off switch device controlled by signals from an output pin ("VBUS_Control") of a gate driver in secondary-side controller 126. The provider switch can include a FET. On one side of the provider switch, a power source node on the VBUS_IN line can be coupled to flyback transformer 130, which is coupled to a large bulk capacitor configured to remove the AC component of the power signal. A power source node can be coupled to an input pin ("VBUS_IN" pin) of secondary-side controller 126. An output node on the VBUS_IN line is coupled to load 122 and another input pin ("VBUS_CTRL" pin) of secondary-side controller 126.

In operation, the direction of power flow on the VBUS_IN line is from flyback transformer 130 to the consumer device that is attached to load 122. When a PD contract with the consumer device is negotiated, secondary-side controller 126 can cause power to be provided to the consumer device at the negotiated voltage and/or current level(s) (e.g., via the provider switch). A high-to-low voltage transition on the VBUS_IN line may be needed when the PD contract is dynamically re-negotiated to lower the VBUS voltage and/or current, e.g., when the consumer device has finished charging its battery and now needs power only to operate.

On detection of fault conditions, a control signal may be sent to disconnect load 122 from the flyback transformer 130. For example, the provider switch can be turned off by driving the output of VBUS_CTRL to zero. This disconnection may be caused by an over-voltage condition, an over-current condition, or other conditions that may require disconnection of load 122 from the flyback transformer 130 for protection of circuits coupled to load 122.

Embodiments described herein can be implemented in a power delivery system, such as a serial bus-compatible power supply device. An example of a serial bus-compatible power supply device may include a serial bus power delivery (SBPD) device, a USB-compatible power supply device, or the like. In some embodiments, an SBPD device is a USB-PD device that is compatible with the USB-PD standard or, more generally, with the USB standard. For example, the SBPD device may provide an output voltage based on an input voltage. The SBPD device may include the various embodiments described herein to facilitate communications between a primary-side controller and a secondary-side controller. The SBPD device may include a power converter (e.g., an AC-DC converter) and a power control analog subsystem (e.g., a USB-PD controller). The power control analog subsystem may include the circuitry, functionality, or both, as described herein for communicating information across a galvanic isolation barrier. The information can include information for different functions, such as OVP (over-voltage protection), UVP (under-voltage protection), OCP (over current protection), SCP (short circuit protection), PFC (power factor correction), SR (synchronous rectification), ACF (active clamp flyback), or the like. The information can include fault information for any of these different functions.

In other embodiments, the SBPD device is connected to a power source, such as a wall socket power source that provides input power. For example, a power source can be an AC source that provides AC input. In other embodiments, the power source may be a different power source, such as a battery, and may provide DC power to the SBPD device. The power converter may convert the power received from the power source (e.g., convert power received to VBUS). For example, a power converter may be an AC-DC converter and convert AC power from the power source to DC power. In some embodiments, the power converter is a flyback converter, such as a secondary-controlled flyback converter, that provides galvanic isolation between the input (e.g., primary-side) and the output (e.g., secondary-side). For example, the secondary-controlled flyback converter may be a single-ended forward converter. In some embodiments, feed-forward information on the secondary-side can be used to limit the maximum duty cycle that can be passed to the primary-side FET. The maximum duty cycle may change with line voltage.

In some embodiments, the SBPD device provides VBUS to a sink device (e.g., via a configuration channel (CC) specifying a particular output voltage, and possibly an output current). SBPD device may also provide access to ground potential (e.g., ground) to the sink device. In some embodiments, the providing of the VBUS is compatible with the USB-PD standard. Power control analog subsystem may receive VBUS from the power converter. The power control analog subsystem may output VBUS. In some embodiments, the power control analog subsystem is a USB Type-C™ controller compatible with the USB Type-C™ standard. The power control analog subsystem may provide system interrupts responsive to the VBUS and/or VBUS_CTRL.

In some embodiments, any of the components of the SBPD device may be part of an IC, or alternatively, any of the components of the SBPD device may be implemented in its own IC. For example, the power converter and power control analog subsystem may be discrete ICs with separate packaging and pin configurations.

In some embodiments, the SBPD device may provide a complete USB Type-C™ and USB-PD port control solution for notebooks, dongles, monitors, docking stations, power adapters, vehicle chargers, power banks, mobile adaptors, and the like.

Embodiments when using isolation or level shifters may require some driver circuit. The driver circuit may be as simple as using a PWM output from secondary-side controller 126 to drive a capacitive coupled controller or optocoupler (also referred to as an optocoupler). The driver circuit can be an elaborate structure when driving signal transformer 140.

Figure 5:
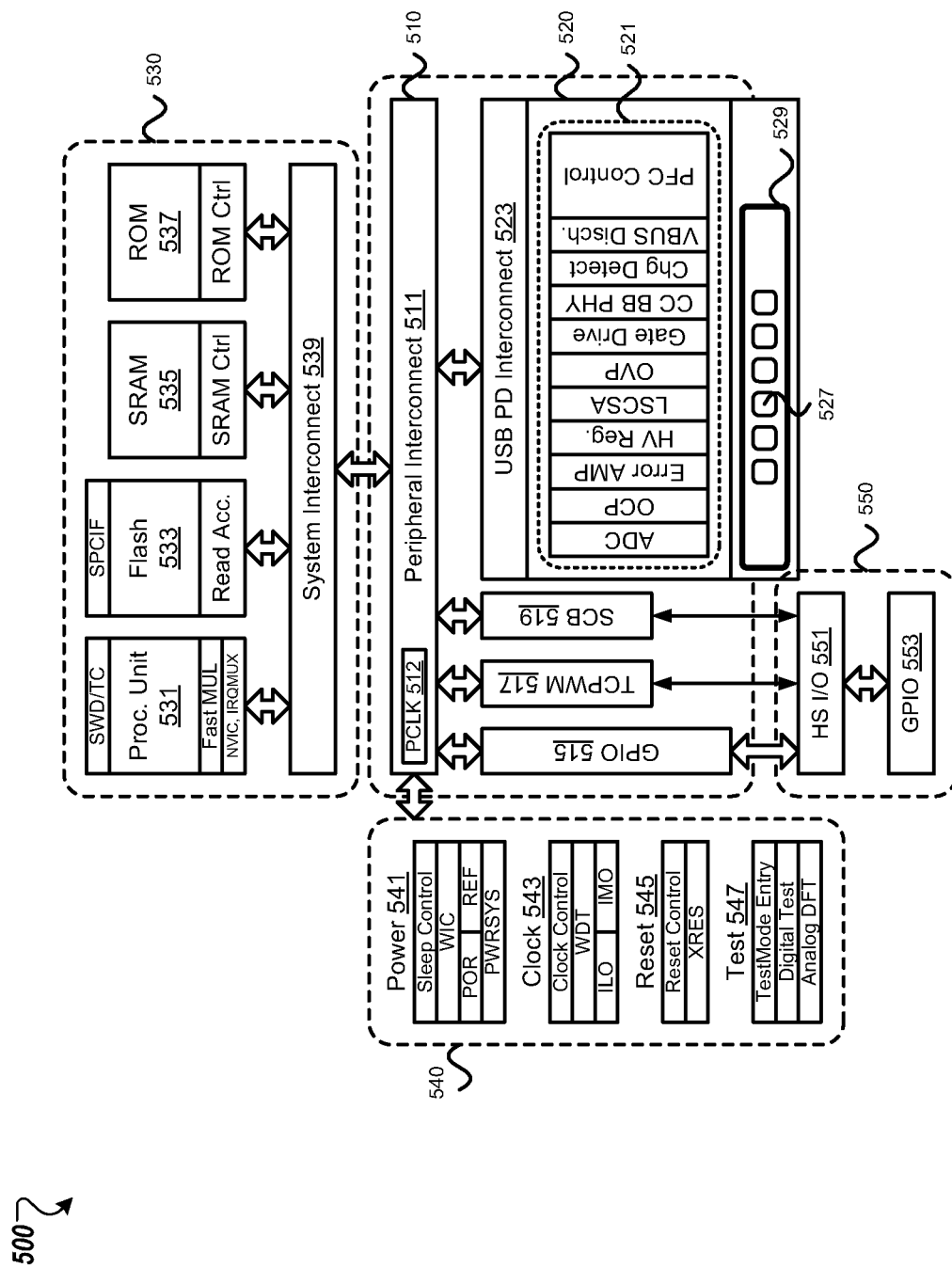
FIG. 5 is a block diagram illustrating an integrated circuit (IC) system for use in power delivery, according to some embodiments.

FIG. 5 is a block diagram illustrating an integrated circuit (IC) system 500 for a USB-enabled device for use in USB power delivery, according to some embodiments. System 500 may include a peripheral subsystem 510, including a number of components for use in USB Power Delivery (USB-PD). Peripheral subsystem 510 may include a peripheral interconnect 511, including a clocking module and a peripheral clock (PCLK) 512 for providing clock signals to the various components of peripheral subsystem 510. Peripheral interconnect 511 may be a peripheral bus, such as a single-level or multi-level advanced high-performance bus (AHB), and may provide a data and control interface between peripheral subsystem 510, central processing unit (CPU) subsystem 530, and system resources 540. Peripheral interconnect 511 may include controller circuits, such as direct memory access (DMA) controllers, which may be programmed to transfer data between peripheral blocks without input by, control of, or burden on CPU subsystem 530.

The peripheral interconnect 511 may be used to couple components of peripheral subsystem 510 to other components of system 500. Coupled to peripheral interconnect 511 may be a number of general-purpose input/outputs (GPIOs) 515 for sending and receiving signals. GPIOs 515 may include circuits configured to implement various functions such as pull-up, pull-down, input threshold select, input and output buffer enabling/disable, single multiplexing, etc. Still, other functions may be implemented by GPIOs 515. One or more timer/counter/pulse-width modulator (TCPWM) 517 may also be coupled to the peripheral interconnect and include circuitry for implementing timing circuits (timers), counters, pulse-width modulators (PWMs) decoders, and other digital functions that may operate on I/O signals and provide digital signals to system components of system 500. Peripheral subsystem 510 may also include one or more serial communication blocks (SCBs) 519 for implementation of serial communication interfaces such as I2C, serial peripheral interface (SPI), universal asynchronous receiver/transmitter (UART), controller area network (CAN), clock extension peripheral interface (CXPI), etc.

For USB power delivery applications, peripheral subsystem 510 may include a USB power delivery subsystem 520 coupled to the peripheral interconnect 511 and comprising a set of USB-PD modules 521 for use in USB power delivery. USB-PD modules 521 may be coupled to the peripheral interconnect 511 through a USB-PD interconnect 523. USB-PD modules 521 may include an analog-to-digital conversion (ADC) module for converting various analog signals to digital signals; an error amplifier (AMP) regulating the output voltage on the VBUS_IN line per a PD contract; a high-voltage (HV) regulator for converting the power source voltage to a precise voltage (such as 3.5-5V) to power system 500; a low-side current sense amplifier (LSCSA) for measuring load current accurately, an over-voltage protection (OVP) module and an over-current protection (OCP) module for providing over-current and over-voltage protection on the VBUS_IN line with configurable thresholds and response times; one or more gate drivers for external power field-effect transistors (FETs) used in USB power delivery in provider and consumer configurations; and a communication channel PHY (CC BB PHY) module for supporting communications on a Type-C™ configuration channel (CC) line. USB-PD modules 521 may also include a charger detection module for determining that a charging circuit is present and coupled to system 500 and a VBUS discharge module for controlling the discharge of voltage on VBUS. The discharge control module may be configured to couple to a power source node on the VBUS_IN line or to an output (power sink) node on the VBUS_IN line and to discharge the voltage on the VBUS_IN line to the desired voltage level (i.e., the voltage level negotiated in the PD contract). USB power delivery subsystem 520 may also include pads 527 for external connections and electrostatic discharge (ESD) protection circuitry 529, which may be required on a Type-C™ port. USB-PD modules 521 may also include a communication module for retrieving and communicating information, such as control signals from a secondary-side controller to a primary-side controller.

GPIO 515, TCPWM 517, and SCB 519 may be coupled to an input/output (I/O) subsystem 550, which may include a high-speed (HS) I/O matrix 551 coupled to a number of GPIOs pins 553. GPIOs 515, TCPWM 517, and SCB 519 may be coupled to GPIOs pins 553 through HS I/O matrix 551.

System 500 may also include a central processing unit (CPU) subsystem 530 for processing commands, storing program information, and storing data. CPU subsystem 530 may include one or more processing units 531 for executing instructions and reading from and writing to memory locations from a number of memories. Processing unit 531 may be a processor suitable for operation in an integrated circuit (IC) or a system-on-chip (SOC) device. In some embodiments, processing unit 531 may be optimized for low-power operation with extensive clock gating. In this embodiment, various internal control circuits may be implemented for processing unit operation in various power states. For example, processing unit 531 may include a wake-up interrupt controller (WIC) configured to wake the processing unit up from a sleep state, allowing power to be switched off when the IC or SOC is in a sleep state. CPU subsystem 530 may include one or more memories, including a flash memory 533, static random access memory (SRAM) 535, and a read-only memory (ROM) 537. Flash memory 533 may be a non-volatile memory (NAND flash, NOR flash, etc.) configured for storing data, programs, and/or other firmware instructions. Flash memory 533 may include a read accelerator and may improve access times by integration within CPU subsystem 530. SRAM 535 may be a volatile memory configured for storing data and firmware instructions accessible by processing unit 531. ROM 537 may be configured to store boot-up routines, configuration parameters, and other firmware parameters and settings that do not change during the operation of system 500. SRAM 535 and ROM 537 may have associated control circuits. Processing unit 531 and the memories may be coupled to a system interconnect 539 to route signals to and from the various components of CPU subsystem 530 to other blocks or modules of system 500. System interconnect 539 may be implemented as a system bus, such as a single-level or multi-level AHB. System interconnect 539 may be configured as an interface to couple the various components of CPU subsystem 530 to each other. System interconnect 539 may be coupled to peripheral interconnect 511 to provide signal paths between the components of CPU subsystem 530 and peripheral subsystem 510.

System 500 may also include a number of system resources 540, including a power module 541, a clock module 543, a reset module 545, and a test module 547. Power module 541 may include a sleep control module, a wake-up interrupt control (WIC) module, a power-on-reset (POR) module, a number of voltage references (REF), and a PWRSYS module. In some embodiments, power module 541 may include circuits that allow system 500 to draw and/or provide power from/to external sources at different voltage and/or current levels and support controller operation in different power states, such as active, low-power, or sleep. In various embodiments, more power states may be implemented as system 500 throttles back operation to achieve a desired power consumption or output. For example, a secondary-side controller implemented on system 500 may access secondary electrical parameters on the secondary-side. At low line and light load, the secondary-side controller may determine that the power state is such that it is not beneficial to switch on a HS switch (e.g., ACF switch). Clock module 543 may include a clock control module, a watchdog timer (WDT), an internal low-speed oscillator (ILO), and an internal main oscillator (IMO). Reset module 545 may include a reset control module and an external reset (XRES) module. Test module 547 may include a module to control and enter a test mode as well as testing control modules for analog and digital functions (digital test and analog DFT).

System 500 may be implemented in a monolithic (e.g., single) semiconductor die. In other embodiments, various portions or modules of system 500 may in implemented on different semiconductor dies. For example, memory modules of CPU subsystem 530 may be on-chip or separate. In other embodiments, separate-die circuits may be packaged into a multi-chip module.

System 500 may be implemented in a number of application contexts to provide USB-PD functionality thereto. In each application context, an IC controller or SOC implementing system 500 may be disposed and configured in an electronic device (e.g., a USB-enabled device) to perform operations in accordance with the techniques described herein. In one example embodiment, a system 500 may be disposed and configured in a personal computer (PC) power adapter for a laptop, a notebook computer, etc. In another example embodiment, system 500 may be disposed and configured in a power adapter (e.g., a wall charger) for a mobile electronic device (e.g., a smartphone, a tablet, etc.). In another example embodiment, system 500 may be disposed and configured in a wall socket that provides power over USB Type-A and/or Type-C™ port(s). In another example embodiment, system 500 may be disposed and configured in a power bank that can get charged and then provide power to another electronic device over a USB Type-A or Type-C™ port. In other embodiments, a system like system 500 may be configured with power switch control circuitry and may be disposed in various other USB-enabled electronic or electro-mechanical devices.

It should be understood that a system, like system 500 implemented on or as an IC controller, may be disposed into different applications, which may differ with respect to the type of power source being used and the direction in which power is being delivered. For example, in the case of a mobile power adapter, the power source is an AC wall socket. Further, in the case of a PC power adapter, the flow of power delivery is from a provider device to a consumer device, while in the case of a power bank, the flow of power delivery may be in both directions depending on whether the power bank is operating as a power provider (e.g., to power another device) or as a power consumer (e.g., to get charged itself). For these reasons, the various applications of system 500 should be regarded in an illustrative rather than a restrictive sense.

Figure 6:
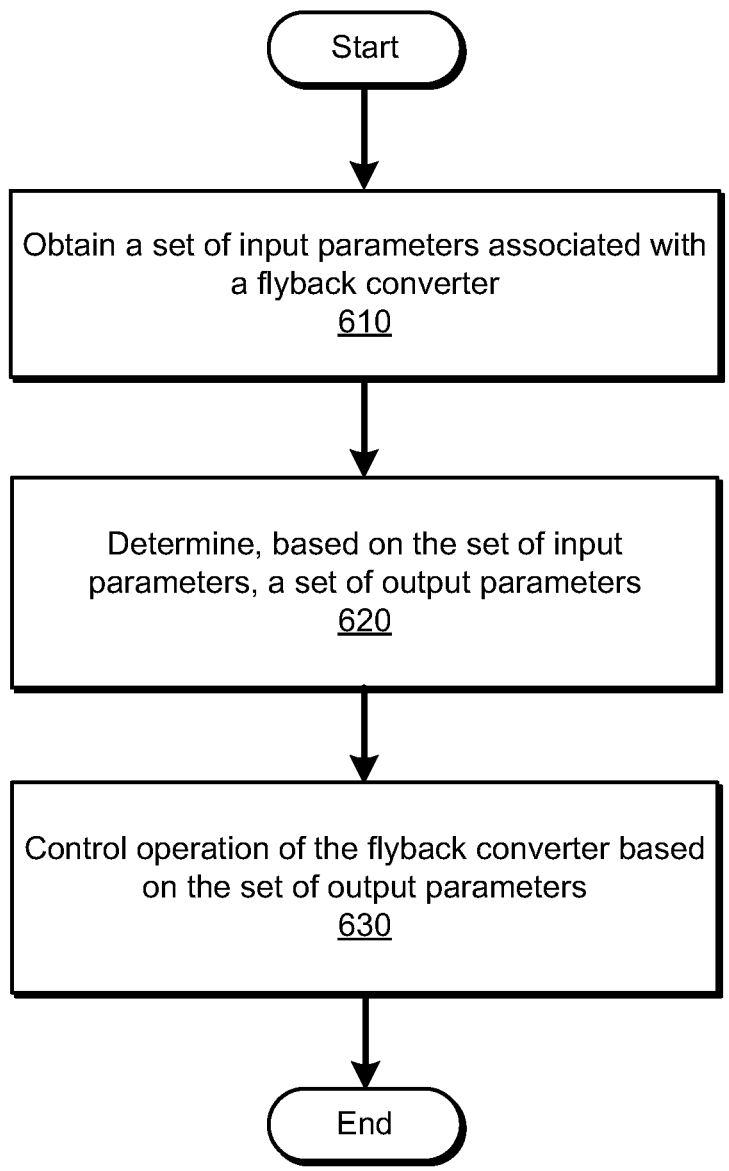
FIG. 6 is a flow diagram of a method of implementing an active clamp flyback (ACF) converter with improved efficiency, according to some embodiments.

FIG. 6 is a flow diagram of a method 600 of implementing a flyback converter with improved efficiency, according to some embodiments. Method 600 may be performed by processing logic that comprises hardware (e.g., circuitry, dedicated logic, programmable logic, microcode, etc.), software, firmware, or a combination thereof. In some embodiments, a secondary-side controller of a flyback converter performs method 600 (e.g., secondary-side controller 126 of FIGS. 1, 2, and 4). For example, method 600 can be performed by firmware of a secondary-side controller. In some embodiments, peripheral subsystem 510 of FIG. 5 performs method 600.

At operation 610, processing logic obtains a set of input parameters associated with a flyback converter. In some embodiments, the flyback converter is an ACF flyback converter. In some embodiments obtaining the set of input parameters includes receiving a set of subsystem parameters from a subsystem. For example, the set of subsystem parameters can indicate a power loss due to switching of a HS switch of a primary side of the flyback converter. In some embodiments, obtaining the set of input parameters includes receiving a set of system parameters from an initial configuration. In some embodiments, the set of system parameters comprises a primary inductance with respect to a flyback transformer, an equivalent capacitance with respect to a primary drain node, and a turns ratio corresponding to the flyback transformer.

At operation 620, processing logic determines a set of output parameters based on the set of input parameters. In some embodiments, the set of output parameters can include at least one of: a pulse width for achieving ZVS ($T_{req\_zvs}$), a duration for which a primary drain stays at 0 V ($T_{dur\_zvs}$), or a power gain ($P_{ACF}$). $T_{dur\_zvs}$ can be used to determine the dead time for the HS switch. In some embodiments, processing logic initializes a set of functions to determine the set of output parameters. In some embodiments, the pulse width can be determined based on the primary inductance, the equivalent capacitance, and the turns ratio. For example, the pulse width can be determined using a function based on equation (1). In some embodiments, the duration can be determined based on the primary inductance, the equivalent capacitance, and the turns ratio. For example, the duration can be determined using a function based on equation (2).

At operation 630, processing logic controls operation of the flyback converter based on the set of output parameters. In some embodiments, controlling operation of the flyback converter includes controlling a turn-on time of the HS switch based on $T_{req\_zvs}$. In some embodiments, controlling operation of the flyback converter includes controlling the duration that the primary drain stays at 0 V based on $T_{dur\_zvs}$. In some embodiments, controlling operation of the flyback converter includes determining whether the power loss due to the switching of the HS switch exceeds the power gain, and toggling the HS switch once in multiple cycles in response to determining that the power loss due to the switching of the HS switch exceeds the power gain. Further details regarding operations 610-630 are described above with reference to FIGS. 1-5.

In the above description, some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

However, it should be borne in mind that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "adjusting," or the like, refer to the actions and processes of a computing system, or similar electronic device, that manipulates and transforms data represented as physical (e.g., electronic) quantities within the device/system's registers and memories into other data similarly represented as physical quantities within the memories or registers or other such information storage, transmission or display devices.

The words "example" or "exemplary" are used herein to mean serving as an example, instance, or illustration. Any aspect or design described herein as "example' or "exemplary" is not necessarily to be construed as preferred or advantageous over other aspects or designs. Rather, the use of the words "example" or "exemplary" is intended to present concepts concretely. As used in this application, the term "or" is intended to mean an inclusive "or" rather than an exclusive "or." Unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

The preceding description sets forth numerous specific details, such as examples of specific systems, components, methods, and so forth, in order to provide a good understanding of various embodiments of the techniques described herein for flyback converters supporting ACF functionality, such as used in USB power delivery applications. However, it will be apparent to one skilled in the art that at least some embodiments may be practiced without these specific details. In other instances, well-known components, elements, or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the spirit and scope of the present invention.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment of the invention. Further, the appearances of the phrases "an" "some embodiment," "one embodiment," "an example embodiment," embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

The above description sets forth numerous specific details, such as examples of specific systems, components, methods, and so forth, in order to provide a good understanding of several embodiments of the present disclosure. It is to be understood that the above description is intended to be illustrative and not restrictive. Many other embodiments will be apparent to those of skill in the art upon reading and understanding the above description. Therefore, the disclosure scope should be determined with reference to the appended claims, along with the full scope of equivalents to which such claims are entitled.

What is claimed is:

1. An apparatus comprising:
an active clamp flyback (ACF) flyback converter comprising:
a primary side comprising a high side (HS) switch, a low side (LS) switch and an ACF driver; and
a secondary side comprising a secondary-side controller configured at least to:
obtain a set of input parameters, the set of input parameters comprising a set of subsystem parameters associated with a subsystem and a set of system parameters associated with an initial configuration, wherein the set of system parameters comprises a primary inductance with respect to a flyback transformer, an equivalent capacitance with respect to a primary drain node, and a turns ratio corresponding to the flyback transformer;
determine a set of output parameters based on the set of input parameters, wherein the set of output parameters comprises a pulse width for achieving zero-voltage switching (ZVS) determined based on the primary inductance, the equivalent capacitance, and the turns ratio; and
control operation of the ACF flyback converter based on the set of output parameters.

2. The apparatus of claim 1, wherein:
to control the operation of the ACF flyback converter, the secondary-side controller is configured to control a turn-on time of the HS switch based on the pulse width for achieving ZVS.

3. The apparatus of claim 1, wherein the set of output parameters comprises a duration for which a primary drain stays at zero volts.

4. The apparatus of claim 3, wherein, to control the operation of the ACF flyback converter, the secondary-side controller is configured to control the duration for which the primary drain stays at zero volts.

5. The apparatus of claim 3, wherein, to control the operation of the ACF flyback converter, the secondary-side controller is configured to determine a deadtime for the HS switch based on the duration for which the primary drain stays at zero volts.

6. The apparatus of claim 3, wherein:
the duration for which the primary drain stays at zero volts is determined based on the primary inductance, the equivalent capacitance, and the turns ratio.

7. The apparatus of claim 1, wherein:
the set of subsystem parameters indicates a power loss due to switching of the HS switch;
the set of output parameters comprises a power gain; and
to control the operation of the ACF flyback converter, the secondary-side controller is configured to:
determine whether the power loss due to the switching of the HS switch exceeds the power gain; and
in response to determining that the power loss due to the switching of the HS switch exceeds the power gain, toggle the HS switch once in multiple cycles.

8. The apparatus of claim 7, wherein the power loss due to the switching of the HS switch is determined based on a power loss flyback transformer loss and ACF flyback driver loss.

9. The apparatus of claim 1, wherein the apparatus comprises a Universal Serial Bus Power Delivery (USB-PD) power adapter.

10. The apparatus of claim 1, further comprising a rectifier, coupled to an alternating current (AC) source, to generate a direct current (DC) output based on an AC input received from the AC source.

11. A method comprising:
obtaining, by a secondary-side controller of a secondary-side of an active clamp flyback (ACF) flyback converter, a set of input parameters, the set of input parameters comprising a set of subsystem parameters associated with a subsystem of a flyback converter and a set of system parameters associated with an initial configuration of the flyback converter, wherein the ACF flyback converter further comprises a primary side comprising a high side (HS) switch and a low side (LS) switch, and wherein the set of system parameters comprises a primary inductance with respect to a flyback transformer, an equivalent capacitance with respect to a primary drain node, and a turns ratio corresponding to the flyback transformer;
determining, by the secondary-side controller, a set of output parameters based on the set of input parameters, wherein the set of output parameters comprises a pulse width for achieving zero-voltage switching (ZVS) determined based on the primary inductance, the equivalent capacitance, and the turns ratio; and
controlling, by the secondary-side controller, operation of the ACF flyback converter based on the set of output parameters.

12. The method of claim 11, wherein:
controlling the operation of the ACF flyback converter comprising controlling a turn-on time of the HS switch based on the pulse width for achieving ZVS.

13. The method of claim 11, wherein:
the set of output parameters comprises a duration for which a primary drain stays at zero volts; and
controlling the operation of the flyback converter comprising at least one of:
controlling the duration for which the primary drain stays at zero volts, or determining a deadtime for the HS switch based on the duration for which the primary drain stays at zero volts.

14. The method of claim 13, wherein:
the duration for which the primary drain stays at zero volts is determined based on the primary inductance, the equivalent capacitance, and the turns ratio.

15. The method of claim 11, wherein:
the set of subsystem parameters indicates a power loss due to switching of the HS switch;
the set of output parameters comprises a power gain; and
controlling the operation of the ACF flyback converter comprising:
determining whether the power loss due to the switching of the HS switch exceeds the power gain; and
in response to determining that the power loss due to the switching of the HS switch exceeds the power gain, toggling the HS switch once in multiple cycles.

16. The method of claim 15, wherein the power loss due to the switching of the HS switch is determined based on a power loss flyback transformer loss and ACF flyback driver loss.

17. A power adapter comprising:
a rectifier, coupled to an alternating current (AC) source, configured to generate a direct current (DC) output based on an AC input received from the AC source; and
an active clamp flyback (ACF) flyback converter comprising:
a primary side comprising a high side (HS) switch, a low side (LS) switch and an ACF driver;
a secondary side comprising a secondary-side controller configured at least to:
obtain a set of input parameters, the set of input parameters comprising a set of subsystem parameters associated with a subsystem and a set of system parameters associated with an initial configuration, wherein the set of system parameters comprises a primary inductance with respect to a flyback transformer, an equivalent capacitance with respect to a primary drain node, and a turns ratio corresponding to the flyback transformer;
determine a set of output parameters based on the set of input parameters, wherein the set of output parameters comprises a pulse width for achieving zero-voltage switching (ZVS) determined based on the primary inductance, the equivalent capacitance, and the turns ratio; and
control operation of the ACF flyback converter based on the set of output parameters; and
a flyback transformer and a signal transformer each coupled to the primary side and the secondary side.

18. The power adapter of claim 17, wherein the power adapter is a Universal Serial Bus Power Delivery (USB-PD) power adapter.

* * * * *